United States Patent
Kasha

(10) Patent No.: US 8,250,723 B2
(45) Date of Patent: Aug. 28, 2012

(54) SYSTEM AND METHOD FOR MOUNTING LENS IN CELLS

(75) Inventor: Vladislav Kasha, Rochester, NY (US)

(73) Assignee: CVI Melles Griot, Inc., Rochester, NY (US)

( * ) Notice: Subject to any disclaimer, the term of this patent is extended or adjusted under 35 U.S.C. 154(b) by 204 days.

(21) Appl. No.: 12/221,464

(22) Filed: Aug. 1, 2008

(65) Prior Publication Data

US 2011/0000066 A1      Jan. 6, 2011

Related U.S. Application Data

(60) Provisional application No. 60/962,809, filed on Aug. 2, 2007.

(51) Int. Cl.
*B23Q 17/00* (2006.01)
(52) U.S. Cl. .................................... 29/407.09
(58) Field of Classification Search .............. 29/407.09, 29/407.1; 319/819, 830
See application file for complete search history.

(56) References Cited

U.S. PATENT DOCUMENTS 4,586,787 A * 5/1986 Fiandra et al. ............... 359/830

* cited by examiner

*Primary Examiner* — John C Hong
(74) *Attorney, Agent, or Firm* — Steven R. Scott

(57) ABSTRACT

This system and method for mounting lenses in lens cells a lens with an annular groove around its peripheral edge and a polygonal mounting clip formed from spring wire with at least two contiguous apexes and a non-contiguous apex such that it is biased towards closure. The mounting clip is nested in the annular groove, forcing the non-contiguous apex open. The lens is firmly held by the mounting clip and transversely extending mounting extensions at each apex are inserted into properly spaced wells in a face of a lens cell body to hold the lens in position over an aperture. An alignment chuck with a lens rest positionable with respect to a lens cell body rest is used to position the lens at the proper height above the lens cell body. The alignment chuck is then spun to align the lens optical axis with the alignment axis of the cell body. After this, the wells serve as reservoirs for a cement or other bonding materials to firmly affix the lens in its clip in perfect position with respect to the lens cell body.

10 Claims, 6 Drawing Sheets

SYSTEM AND METHOD FOR MOUNTING LENS IN CELLS

CROSS-REFERENCE TO RELATED APPLICATIONS

This application claims an invention which was disclosed in a United States provisional patent application filed Aug. 2, 2007, Ser. No. 60/962,809, entitled "System and Method for Mounting Lens in Cells". Priority benefit of the said United States provisional application is hereby claimed, and the aforementioned application is hereby incorporated herein by reference.

BACKGROUND AND SUMMARY

My invention pertains to the field of lenses and lens cells. More particularly, it deals with the precise and accurate centering and lineal positioning of a lens in and with respect to the body of a lens cell.

Precision optical systems often rely and are based upon the use of optical lenses in and as a part of lens cells which include the lens itself and a lens cell body to which the lens is mounted. Thus, a lens cell typically includes a precision formed body which is generally cylindrical or disc shaped. This body has a central aperture for mounting the lens in alignment with an optical axis of a larger optical system. For the purpose of aligning the lens correctly, the cell body can also be said to have its own alignment axis (which will ultimately be aligned with the optical axis for the larger system when the lens cell is mounted therein). In addition, the lens cell serves as a "holder" for the lens, serves as a means by which the lens can be mounted to and in the larger optical system, and (finally) serves as a means by which the lens can be manipulated by and for the purposes of that system.

In precision optical systems it is, therefore, imperative that the lens be accurately and securely mounted to the cell body such that it is exactly coaxial with the alignment axis of the lens cell body and is also precisely positioned in spaced relationship to the cell body along this axis. Unfortunately, in the past, there have been a lack of adequate methods, systems and apparatus for precisely and accurately accomplishing this.

My system and method for mounting lenses in lens cells solves this problem. It uses a lens with an annular groove around its peripheral edge and a polygonal mounting clip formed from spring wire with at least two contiguous apexes and a non-contiguous apex which is biased towards closure. The mounting clip can be nested in the annular groove such that it is mounted around the lens with the lens forcing the non-contiguous apex open. Due to the biasing provided by the materials and configuration, this means that the lens is firmly held by the mounting clip when in this position and can be used to join the lens to a lens cell body with a lens aperture. For this purpose, the polygonal mounting clip has transversely extending mounting extensions at each apex which can be inserted into properly spaced "holders" in the form of wells in a face of the lens cell body to hold the lens in position over the aperture.

In addition, my invention includes methods and additional apparatus for use in properly aligning the optical axis of the lens with the alignment axis of the cell body. This includes an alignment chuck on which the lens as well as the lens and cell body combination can be mounted. This alignment chuck has a lens rest positionable with respect to a lens cell body rest so that the lens can be positioned at the proper height above the lens cell body. It also helps in the process of centering the lens and aligning its axis with the alignment axis, particularly via the spin alignment process of my invention. And, after completion of the all of the aforesaid steps (and others)—all as described in more detail herein, the wells can serve as reservoirs for a cement or other bonding materials to firmly affix the lens in its clip in perfect position with respect to the lens cell body.

DESCRIPTION

FIGS. 1A through 3B provide an initial introduction to the lens 1 and lens mounting clips 2 I have developed for use in my invention. The lens 1 has an optical axis 1000, an outer diameter (OD) lens radius R1, and is distinguished by an annular groove 1A by which it interfaces with clip 2. Clip 2 is preferably formed as a three-sided wire clip in the form of an equilateral triangle having two closed ("contiguous") apexes 2A and an open (or "non-contiguous") apex 2B, but could be formed in other polygonal shapes. Portions of the wire clip 2 forming apexes 2A, 2B are turned and bent at a right angle to the plane of the clip 2 so as to form mounting extensions 30 that can serve as "legs" for the clip 2.

Figure 1A:
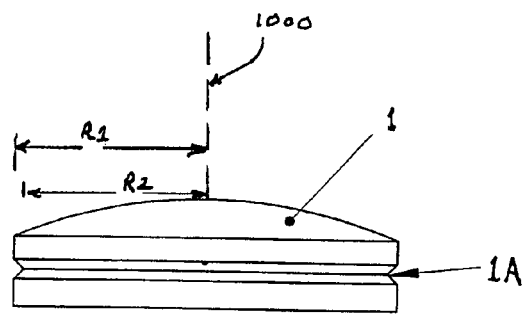
FIG. 1A provides a side edge view of a lens in accordance with the teachings of the invention.
Figure 1B:
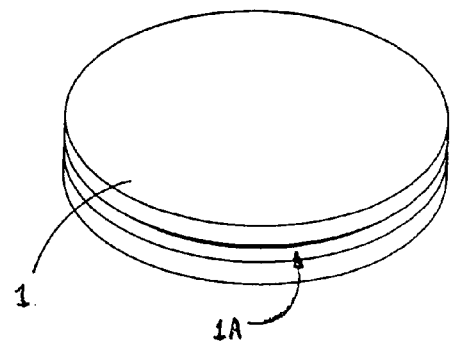
FIG. 1B provides a perspective view of the lens illustrated in FIG. 1A.
Figure 2A:
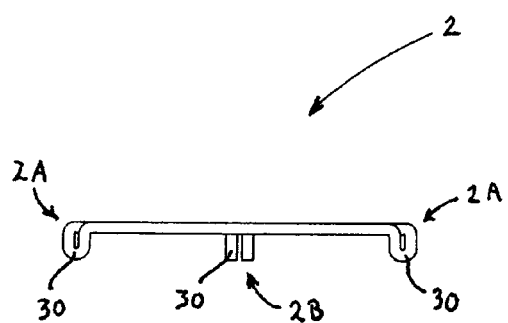
FIG. 2A provides a side edge view of a three-sided wire spring used as a lens mounting clip in accordance with the teachings of the invention.
Figure 2B:
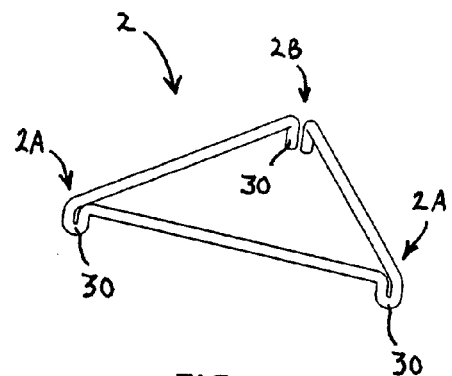
FIG. 2B provides a perspective view of the lens mounting clip illustrated in FIG. 2A.
Figure 3A:
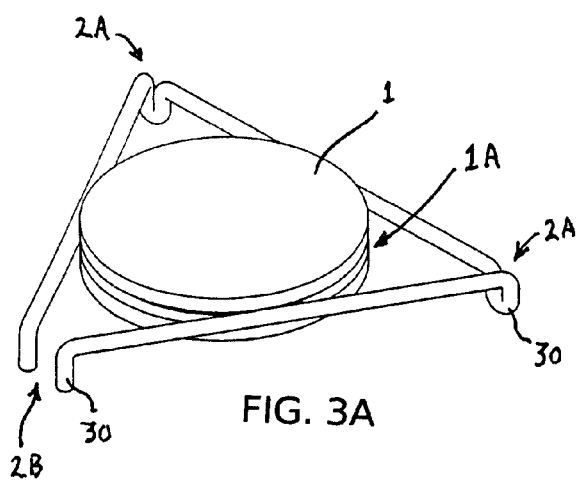
FIG. 3A provides a first perspective view of the lens of FIGS. 1A and 1B mounted in the lens mounting clip of FIGS. 2A and 2B to form the lens clip assembly of my invention.
Figure 3B:
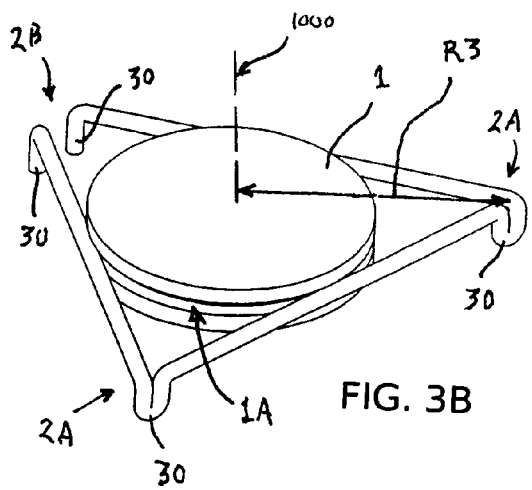
FIG. 3B provides a second perspective view of the lens clip assembly produced in accordance with the teachings of the invention.
Figure 4A:
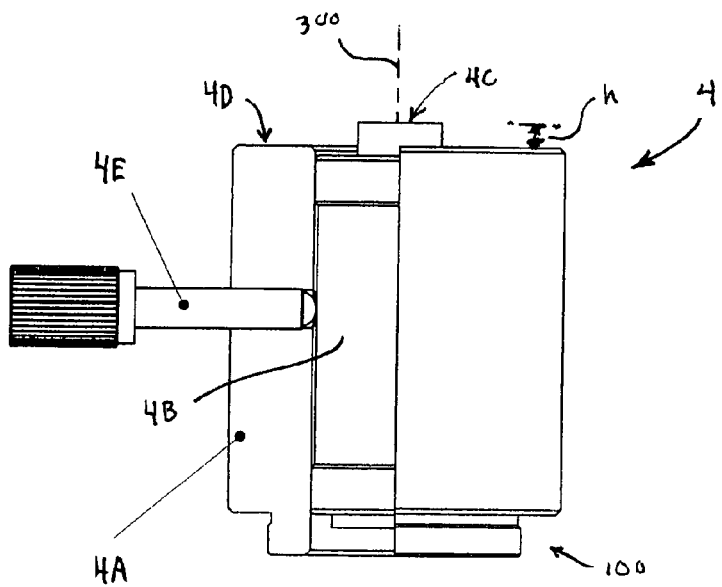
FIG. 4A provides a partial cut-away view from the side of an alignment chuck in accordance with the teachings of the invention.
Figure 4B:
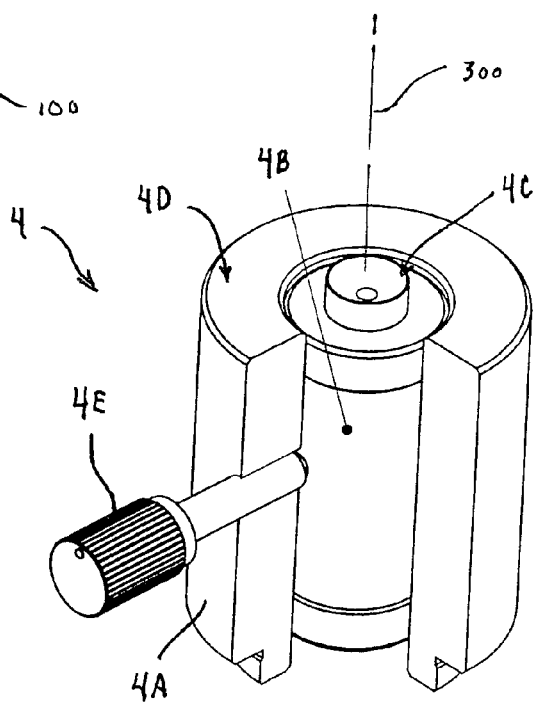
FIG. 4B provides a perspective partial cut-away view of the alignment chuck of FIG. 4A.

As illustrated in FIGS. 3A and 3B, an inner diameter (ID) radius R2 of lens 1 at annular groove 1A is such as to partially force open apex 2B when fitted within the triangular mounting clip 2. Thus, when lens 1 is positioned within clip 2, clip 2 is partially forced open at apex 2B and, acting as a spring, seeks to close—firmly gripping and holding lens 1. In this configuration, as can be seen in the drawing figures, the lens clip assembly 3 already serves to roughly center lens 1 between the apexes 2A, 2B of mounting clip 2 (which are located at an approximate apex radius R3 from the optical axis 1000). The mounting extensions of lens clip 2 also now provide "legs" capable of holding lens 1 in spaced relationship to a lower surface. However, it is necessary to provide still greater precision in both of these areas as well as a sturdier mount for precision optical purposes.

The alignment chuck 4 of my invention, as illustrated in FIGS. 4A through 8 forms part of the basis for attaining the level of precision required. Alignment chuck 4 is a precision tool provided with a base 100 adapted to interface with and mount on an air bearing chuck 200. It is further comprised of an outer barrel 4A in which is mounted an adjustable inner cell 4B with a lens rest extension 4C having a radius smaller than R1. Adjustable cell 4B can slide upward and downward in outer barrel 4A for precision adjustment of the height "h" of the lens rest 4C above an upper surface of barrel 4A that can act as a cell body rest 4D for a cell body 6.

Once the aforesaid adjustment is made, a locking screw with handle 4E can be used to secure outer barrel 4A and inner cell 4B (and hence lens rest 4C and cell body rest 4D), in proper spaced relationship. It should also be noted that barrel 4A, inner cell 4B and lens rest 4C are cylinders concentrically arranged around a central chuck alignment axis 300 which will, via the process and parts described herein, also become coaxial with the optical axis 1000 of the lens 1 and other items in the manner further described below.

Figure 5:
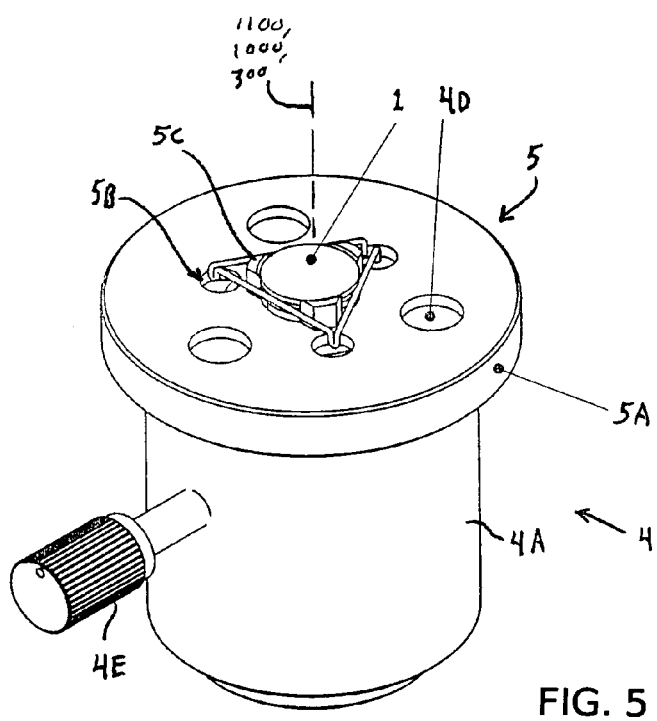
FIG. 5 provides a perspective view of a lens in lens mounting clip, as previously illustrated in FIGS. 1A through 3B, being initially positioned for centering as well as being initially positioned for height above the top surface of the alignment chuck body, by use of the alignment chuck in combination with a lens centering ring in accordance with the teachings of the invention.

FIG. 5 provides a perspective view of the lens clip assembly 3 (as previously illustrated in FIGS. 3A and 3B) positioned for the purpose of initially adjusting "h" on lens rest extension 4C via a lens centering mount 5. Lens centering mount 5 has an annular rim 5A that fits snugly around the outer edge of cylindrical barrel 4A, bringing its centering mount axis 1100 into alignment with chuck axis 300. Thus, the other features symmetrically arranged around mount axis 1100 are now also symmetrically arranged around chuck axis 300. These features include three holes 5B spaced at a radius R3 around central axis 300. These holes 5B are more than large enough to accommodate the downward extensions of each apex 2A, 2B of clip 2. Thus, as illustrated in FIG. 5A, they serve to roughly center clip assembly 3 and to bring optical axis 1000 into approximate alignment with alignment axis 300.

This task is further accomplished by lens centering extensions 5C extending upward from lens centering mount 5. These have an edge at R1 (and are otherwise dimensioned to fit between the lens 1 and apexes 2A, 2B of lens clip assembly 3) so as to firmly center lens 1 and hold the entire clip assembly in proper position for adjustment of the height "h" of lens 1 above cell body rest 4D. The height "h" itself is determined by the proper lineal positioning along the optical axis 1000 of lens 1 in and with respect to the body of lens cell 6, as determined by the particular optical requirements of the application for which the lens cell 6 and lens 1 are to be used.

Figure 6:
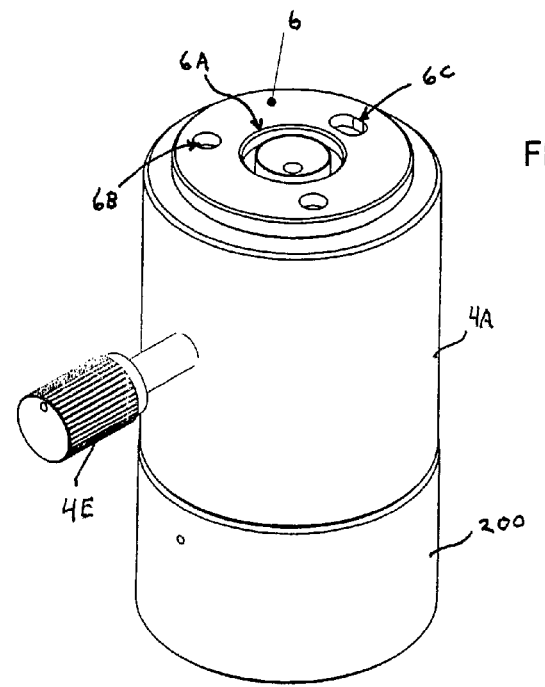
FIG. 6 provides a perspective view of a cell body initially placed on the top of the alignment chuck for centering in accordance with the teachings of the invention.
Figure 7:
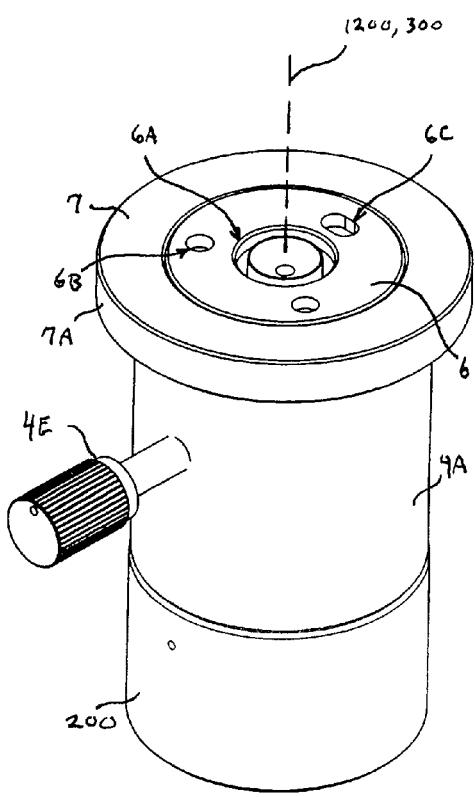
FIG. 7 provides a perspective view of the cell body placed on the top of the alignment chuck being centered thereon via a cell centering ring in accordance with the teachings of the invention.

After accomplishment of the foregoing, lens clip assembly 3 is removed and disc shaped lens cell 6 (with central aperture 6A) is placed on alignment chuck 4 (as illustrated in FIG. 6) and centered using cell centering ring 7 (as illustrated in FIG. 7). As illustrated, cell centering ring 7 (like lens centering mount 5) has an annular rim 7A that fits snugly around the outer edge of cylindrical barrel 4A, bringing its cell centering axis 1200 into alignment with chuck axis 300. Then, like the three holes 5B previously discussed, the three wells (or pits) 6B, 6C symmetrically arranged around cell 6 and spaced outward at a radius R3 from axis 1300, are now also symmetrically arranged around chuck axis 300. These wells 6B, 6C act as "holders" for the extensions 30 and are more than large enough to accommodate the mounting extensions 30 of each apex 2A, 2B of clip 2, with wells 6B being semi-hemispherical in shape, and well 6C being more oblong to accommodate the spread of downward extensions at non-contiguous apex 2B.

Figure 8:
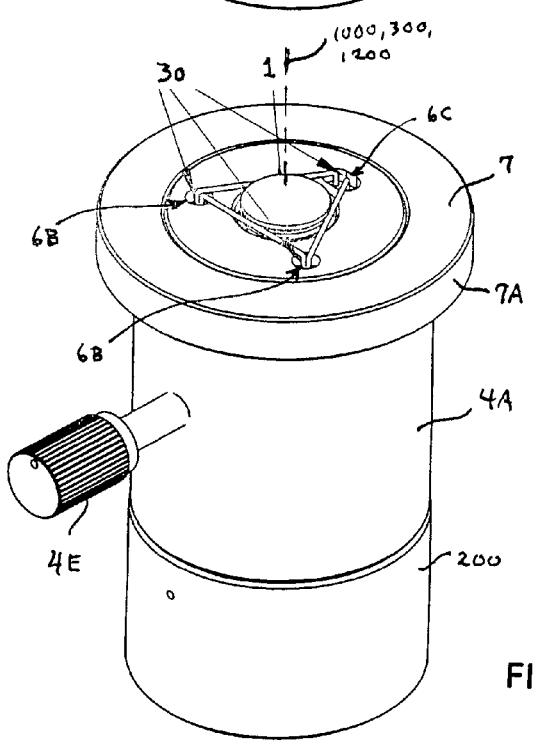
FIG. 8 provides a perspective view of the lens in lens mounting clip placed in position in the cell body on the top of the alignment chuck prior to being affixed to said lens mounting cell.

Thus, upon placement of the lens clip assembly 3 into position over/on cell 6, as illustrated in FIG. 8 with the lens 1 on lens rest extension 4C: (1) the body of cell 6 is centered and axes 1000, 1200 and 300 are axially aligned; (2) the height "h" of lens 1 is correct (because of the previous adjustment of "h" discussed with respect to FIG. 5, above); and (3) lens 1 is centered (subject to fine adjustment of its optical axis 1000 to bring it into precise alignment with axes 1200 and 300) via the placement of the downward extensions of apexes 2A, 2B within wells 6B and 6C.

Figure 9A:
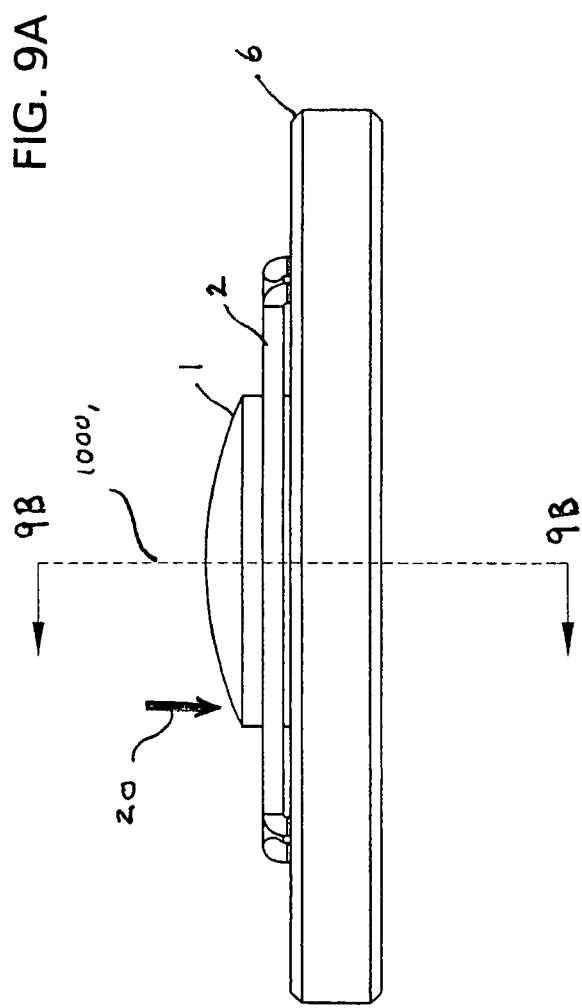
FIG. 9A provides a side view of the lens and lens cell combination of FIG. 8 from the side.

Fine adjustment of optical axis 1000 and lens 1 position is accomplished by using the air chuck 200 to spin the assembly pictured in FIG. 8. Any axial misalignment of optical axis 1000 with axes 1200 and 300 at this point will be the result of a slight canting of lens 1, making one edge of the lens 1 higher than the other and causing a distinct and detectable oscillation ("wobbling") of lens 1 as it is spun. However, by applying a slight pressure or contact to the upper surface of lens 1 close to its outer periphery as it is being spun (i.e., close to radius R1—said pressure being schematically illustrated by arrow 20 in FIG. 9A), the high side can be brought down (and the low side brought up). The canting of lens 1 will have been eliminated when the "wobble" is no longer detectable, bringing optical axis 1000 into perfect alignment with axes 1200 and 300.

Figure 9B:
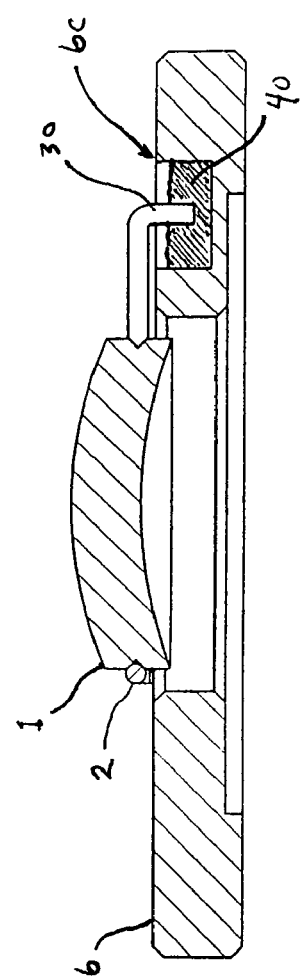
FIG. 9B provides a cross-sectional view of the lens and lens cell combination taken through 9B-9B of FIG. 9A.
Figure 10:
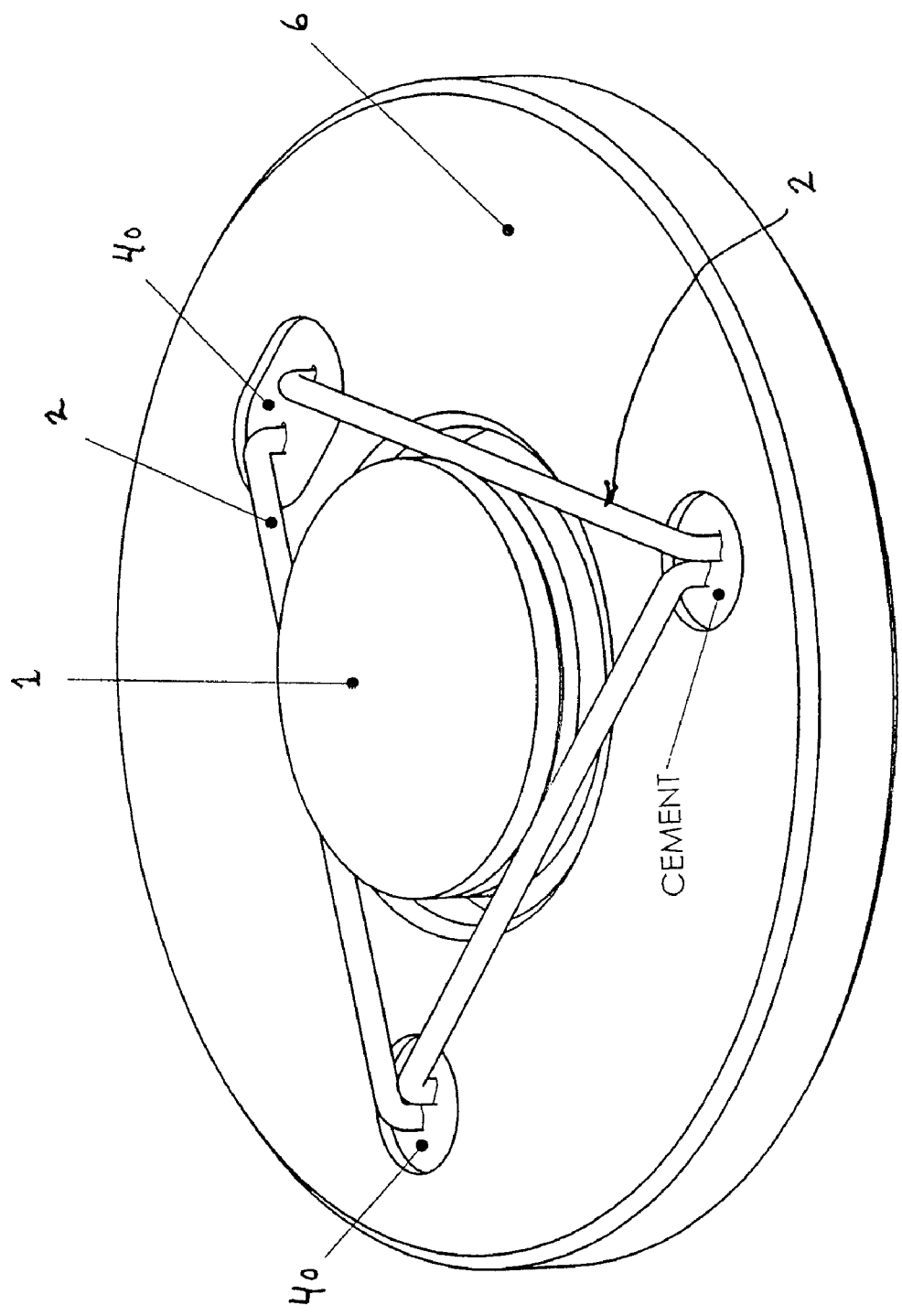
FIG. 10 provides a perspective view of a finished lens cell assembly produced in accordance with the teachings of the invention.
Figure 11A:
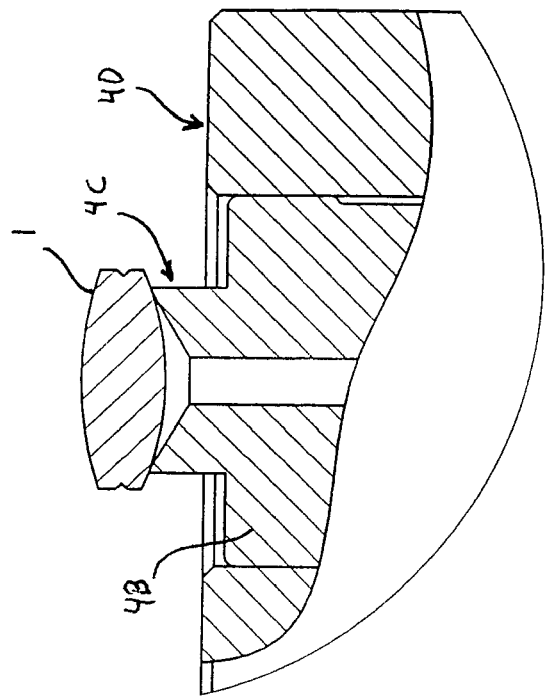
FIG. 11A provides a cross-sectional illustration of a lens having a convex lower face positioned on a preferred embodiment of the lens rest extension of the invention.
Figure 11B:
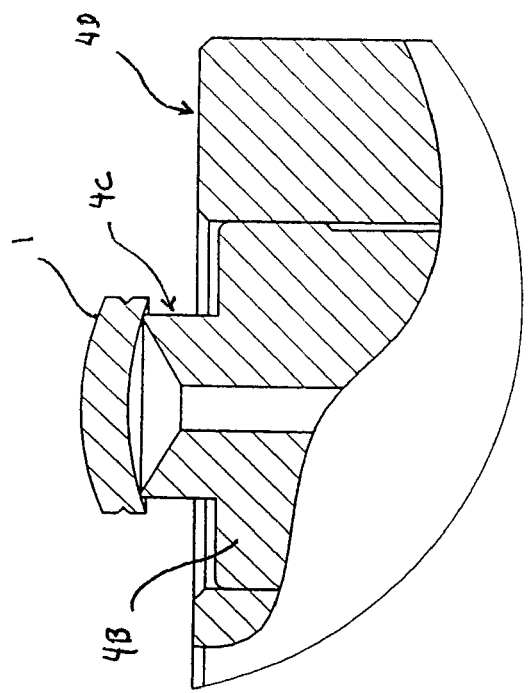
FIG. 11B provides a cross-sectional illustration of a lens having a concave lower face positioned on a preferred embodiment of the lens rest extension of the invention.

At this point, the parts of the lens cell 3 are affixed in position by placement of a cement compound 40 in well 6B, 6C as illustrated in FIGS. 9B and 10, and the completed lens cell is ready for removal and use as soon as the cement compound has hardened/cured. However, it should be remembered that numerous variations are possible without exceeding the ambit and scope of the inventive concept. One such variation is illustrated in FIGS. 11A and 11B, where a preferred configuration for the lens rest extension 4C is illustrated. In the prior embodiments illustrated, the lens rest extension 4C is basically squared-off across with a radius smaller than R1, making it suitable for use with a lens having a concave lower surface as illustrated in FIG. 11B, but not for use with a lens having a convex lower surface (like the one illustrated in FIG. 11A). The configuration illustrated in FIGS. 11A and 11B, which is radically concave at its upper surface and therefore presents a single circumferential edge for balancing either type of lens, eliminates this problem.

Numerous other changes are also possible. Accordingly, it is to be understood that the embodiments of the invention herein described are merely illustrative of the application of the principles of the invention. Further, various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims. Thus, reference herein to details of the illustrated embodiments is not intended to limit the scope of the claims, which themselves recite those features regarded as essential to the invention.

What is claimed is:

1. A system for mounting lens in lens cells, comprising:
   a lens with an optical axis and a peripheral edge, where said lens has an annular groove in said peripheral edge;
   a polygonal mounting clip for said lens formed with a non-contiguous apex and which said polygonal mounting clip is spring biased towards closure of said non-contiguous apex; and
   wherein the mounting clip can be nested in said annular groove such that it is mounted around said lens, and said lens forces the non-contiguous apex open.

2. The system described in claim 1, wherein said polygonal mounting clip has mounting extensions at each apex.

3. The system described in claim 1, further including a lens cell body with an aperture there through, where the lens is mounted to said body over the aperture via said mounting clip.

4. The system described in claim 2, further including a lens cell body with an aperture there through, where the lens is mounted to said body over the aperture via the mounting extensions of said mounting clip.

5. The system described in claim 4, wherein said lens cell body includes mounting extension holders for said mounting extensions, such that positioning said mounting extensions in said mounting extension holders positions said lens over the aperture.

6. The system described in claim 5, wherein said holders are wells, and said lens is affixed in position relative to said cell body by placing cement in said wells.

7. The system described in claim 3, further including an alignment chuck with an alignment axis, a lens cell body rest and a lens rest translatable along said alignment axis with respect to said body rest, wherein said lens rest can extend through said aperture when the lens cell body is placed on the lens cell body rest to support the lens in relationship to the lens body so that said lens can be affixed to said lens cell body.

8. The system described in claim 7, wherein said alignment chuck can be spun around said alignment axis with the lens resting on the lens rest and the lens cell body resting on the lens cell body rest in order to align the optical axis with the alignment axis prior to affixing said lens to said lens cell body.

9. The system described in claim 8, further including at least one of a lens centering mount for centering the lens on the lens rest and a cell centering ring for centering the lens cell on the lens cell rest, wherein any said lens centering mount can be used to center the lens on the lens rest prior to or while positioning said lens along said alignment axis with respect to said lens cell body using said lens rest and said lens cell body rest, and any said cell centering ring can be used for centering the lens cell on the lens cell rest prior to or while aligning the optical axis with the alignment axis.

10. The system described in claim 9, wherein said polygonal mounting clip has mounting extensions at each apex, and the lens is mounted to said body over the aperture via the mounting extensions of said mounting clip.

\* \* \* \* \*